Patented Aug. 8, 1950

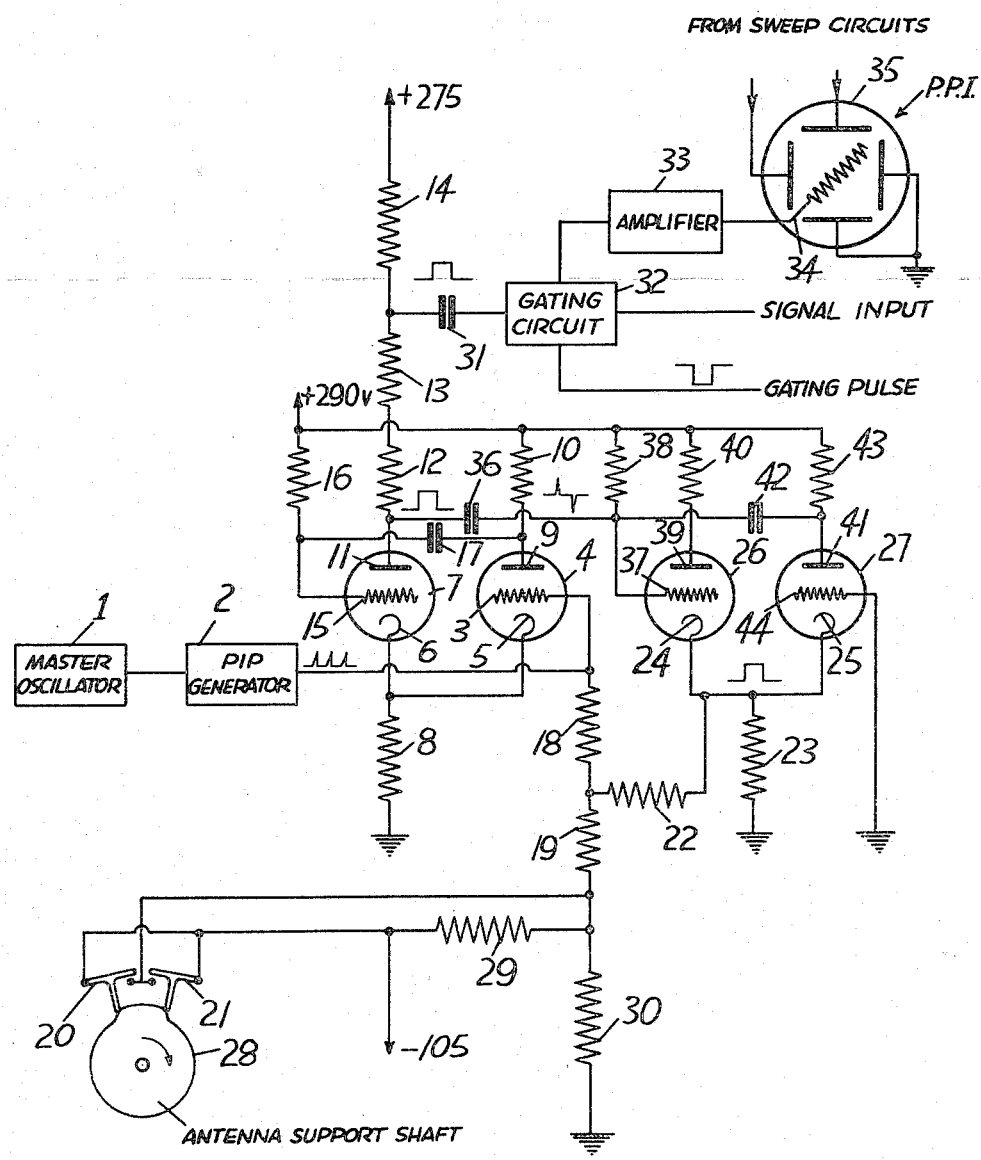

2,517,635

UNITED STATES PATENT OFFICE 2,517,635

RADAR MARKER CIRCUIT

Robert R. Darden, Jr., Solromar, Calif., and Michael F. Kolodziej, Waltham, Mass., assignors to Raytheon Manufacturing Company, Newton, Mass., a corporation of Delaware Application February 16, 1949, Serial No. 76,708

6 Claims. (Cl. 343—100)

This application relates to radar systems and more particularly to a circuit in a radar system whereby a mark may be accurately displayed on a cathode ray tube to indicate the relative direction of some object which is fixed with respect to the indicator, for example, the bow of a ship on which the radar system is installed.

This mark which may hereafter be called ship's head marker is desirable since the position of the ship's head on the face of a plan positioning indicator cathode ray tube will vary with the compass bearing of the ship itself if the presentation used is relying on true target bearings.

Therefore, it is an object of this invention to produce a mark which will accurately indicate the direction of the ship's head on the indicator tube.

A further object of this invention is to devise a circuit which will produce a ship's head marker comprising a single radial line for high speeds of rotation of the antenna.

Other and further objects of this invention will be apparent as the description thereof progresses reference being had to the drawing wherein:

The single figure represents a schematic diagram of the ship's head marker circuit which may be used in conjunction with any radar system.

Referring now to the drawing there is shown a master oscillator 1 whose output is a sinusoidal wave which in this particular embodiment may have a frequency of 1140 cycles per second. This master oscillator is used to synchronize the various units of the radar system such as the transmitter and receiver sweep circuits. The sine wave emitted from the master oscillator 1 is fed into a pip generator 2 which generates positive pips of a few microseconds duration in synchronism with the sine wave input.

The pips are fed to the grid 3 of a normally cut-off tube 4 of a two-tube multivibrator. The cathode 5 of tube 4 is connected directly to the cathode 6 of the other tube 7 of the multivibrator which is normally conductive. Both cathodes 5 and 6 are connected to ground through a cathode resistor 8. The plate 9 of tube 4 is connected to a positive potential through a resistor 10, and the plate 11 of tube 7 is connected to a positive potential through a series of resistors 12, 13 and 14. The grid 15 of tube 7 is connected to a positive potential through a resistor 16, and to the plate 9 of the tube 4 through a condenser 17. The grid 3 of tube 4 is ordinarily maintained well below cut-off, that is, at a negative bias greater than the sum of the potential required to cut off tube 4 plus the amplitude of the pips from generator 2, by being connected through a grid resistor 18 to a tap on a voltage divider network. This voltage divider network comprises a resistor 19, one end of which is connected to resistor 18 and the other end of which is connected to a negative potential of, for example, minus 105 volts through two normally closed switches 20 and 21 in parallel. The junction between resistor 18 and resistor 19 is connected to ground through resistor 22 and resistor 23 in series. The junction between resistors 22 and 23 is connected to cathode 24 and 25 of two tubes 26 and 27, respectively, which constitute a second multivibrator. The values of resistors 19, 22 and 23, and the current drawn by the cathode 24 of the normally conducting tube 26, are such that the above-described bias is applied to the grid 3 of tube 4. In this condition the pips from the generator 2 are insufficient to drive the grid 3 of tube 4 out of cut-off.

The switches 20 and 21, which are actuated by a cam 28 connected to the antenna such that they are both open at the same time once every revolution of the antenna, disconnect the resistor 19 from being directly applied to the negative potential. This cam 28 is attached directly to the antenna such that the switches which are opened in succession are both open when the antenna is pointed in a predetermined direction. This direction, for example, in the present embodiment is the direction wherein the antenna is pointed at the bow of the ship. When the switches 20 and 21 are both opened the resistor 19 is connected to the junction of two resistors 29 and 30 which constitute a voltage divider, one end of which is connected to ground and the other end of which is connected to the aforementioned source of negative potential. This voltage divider comprising resistors 29 and 30 applies a potential to the resistor 19 which is such that, with the tube 26 in its original conducting position, a lower bias potential is applied to the grid 3 of tube 4 through resistor 18. However, due to the current drawn through cathode resistor 8 by the tube 7, the cathode 5 of tube 4 is maintained sufficiently positive to still cut off tube 4.

With this lower bias potential on grid 3, tube 4 may now be driven into conduction by the positive pips from pip generator 2. Current drawn through resistor 10 by the conduction of tube 4 drops the potential of the plate 9 thus feeding a negative voltage to the grid 15 of tube 7 through the condenser 17. This reduces the current through the cathode resistor 8 which causes the tube 4 to conduct even more heavily. This action causes the tube 7 which was normally conducting heavily to be cut off. The tube 7 remains cut off until the condenser 17 charges, through the resistor 16 and the resistors 8 and 10 in parallel, sufficiently to move the grid 15 of tube 7 positive enough for the tube 7 to conduct. Thereupon more current flows through cathode resistor 8 increasing the bias on tube 4 which drives the plate 9 of tube 4 positive thus driving the grid 15 of tube 7 more positive through condenser 17 until the original condition is reached. This operation of the tubes 4 and 7 produces a rectangular pulse, at the junction between the resistors 13 and 14, which is positive in nature. The width of this pulse is determined primarily by the values of condenser 17 and resistor 16 and is preferably somewhat greater than a quarter cycle of the master oscillator frequency. The pulse which occurs at the junction of the resistors 13 and 14, in the form of a positive rectangular voltage wave, is fed through a condenser 31 to a gating circuit 32, the operation of which is more completely described in copending application Ser. No. 76,492, filed February 15, 1949. This gating circuit, which is synchronized to the master oscillator 1, passes the pulse during a desired portion of the sweep cycle through an amplifier 33 to the grid 34 of an indicator tube 35.

In the present embodiment, the tube 35 is a cathode ray tube being operated as a plan position indicator, wherein the sweep of the electron beam controlled by the grid 34 starts from the center of the screen and moves radially outward at a rate such that it reaches the periphery of the screen in approximately a quarter cycle of the master oscillator frequency, and the gating circuit 32 is turned on by a suitable gating pulse to pass both incoming signals and the pulses appearing at the junction of the resistors 13 and 14 during this quarter cycle. These pulses are synchronized such that they occur at the beginning of the sweep with the result that a bright line appears on the screen extending from the center thereof to the outer edge whenever the multivibrator tube 4 is triggered. Since this triggering occurs only when both switches 20 and 21 are open, when the antenna is pointed at the ship's bow, the bright line will indicate the direction of the ship's head regardless of the direction in which the ship is pointed.

Now then, since the antenna is rotated at a very rapid rate, for example, 60 R. P. M., it is difficult to have both switches open for a duration that can be accurately controlled, due to the inherent inertia of any mechanical switching. Therefore, the multivibrator comprising tubes 4 and 7 might be triggered several times successively each time the switches 20 and 21 are open. This will produce a series of closely spaced radial lines on the screen whenever the switches 20 and 21 are open.

In order to produce only a single trace for the ship's head marker, a quenching circuit is triggered by the trailing edge of the pulse generated by the multivibrator tubes 4 and 7 which renders the tube 4 inoperative for a period of several cycles of the master oscillator, whereupon at least one switch 20 has closed, thus preventing the operation of the tube 4. This quenching circuit is fed by the pulse appearing on the plate 11 of tube 7 which is connected through a condenser 36 to the grid 37 of tube 26. The grid 37 is connected to a positive potential through a resistor 38 and the plate 39 of tube 26 is connected to a positive potential through a resistor 40. The grid 37 is also connected to the plate 41 of tube 27 through a condenser 42. The plate 41 of tube 27 is connected to a positive potential through a resistor 43. The grid 44 of tube 27 is connected to ground. As aforementioned, the cathodes 24 and 25 of the tubes are connected to the junction between resistors 22 and 23 which form part of a voltage divider network feeding a bias voltage to the tube 4. The tube 26 is normally conducting since its grid 37 is connected to a positive potential through the resistor 38. The tube 27 is normally cut off due to the voltage impressed on its cathode 25 by the current flow of tube 26 through the common cathode resistor 23. When a positive pulse is fed through the condenser 36 to the grid 37 of tube 26, it is differentiated by the short time constant comprising the condenser 36 which is of a low value and the relatively low grid to cathode resistance of the tube 26 which is drawing grid current. This produces a positive pip on the grid 37 due to the leading edge of the pulse and a negative pip due to the trailing edge of the pulse. The positive pip will have no effect since tube 26 is already conducting heavily. However, the negative pip generated by the trailing edge of the pulse will cut off the tube 26 and cause conduction of tube 27 due to the common cathode resistor 23 and the coupling between the plate 41 of tube 27 and the grid 37 of tube 26 by condenser 42. The tube 26 will remain cut off until the condenser 42 charges through resistor 38 and the resistor 43 parallel with cathode resistor 23 sufficiently to allow tube 26 to begin to conduct whereupon the tubes return to their normal conditions wherein tube 26 is conducting heavily and tube 27 is cut off. Tube 27 will draw less current through the resistor 23 during its period of conduction than will tube 26 during its period of conduction due to the fact that the grid 44 of the tube 27 is connected to ground rather than a positive potential. Therefore, when the grid 37 of tube 26 is triggered by the negative pip derived from the trailing edge of the pulse generated at plate 11 of tube 7, a negative pulse will appear across the cathode resistor 23. The width of this pulse is governed mainly by the values of condenser 42 and the resistor 38 and is made wider than the duration of the time during which both switches 20 and 21 are open. This negative pulse is applied through resistor 22 and resistor 18 to positively cut off the grid 3 of tube 4 whereby the multivibrator is only triggered by the first of the pulses appearing on the grid 3 when the switches 20 and 21 are both open. Thus it may be seen that a single pulse will be fed through the gating circuit 32, when the switches 20 and 21 are both open, to produce a single line on the screen of the tube 35 for the ship's head marker.

This completes the description of the modification of the embodiment of the invention illustrated herein. However, many modifications will be apparent to persons skilled in the art; for example, any other source of pulses could be substituted for the master oscillation and pip generator shown herein. Other types of pulse generator could be substituted for the multivibrators, and a single switch could be used rather than the two switches 20 and 21 in the antenna. Also, the marker pulse could be applied to any appropriate electrode of the cathode ray tube without passing through the gating circuit 32 and, negative pulses could be obtained from either plate 9 of tube 4 or cathodes 5 and 6 of tubes 4 and 7. In addition, switching could be accomplished by any suitable means, not necessarily a radar antenna, and the pulses obtained may be used for other purposes than presentation on a plan position indicator. Further, the values of circuit components may be varied considerably within the spirit and scope of this invention.

Accordingly, applicants do not wish to be limited by the specific details of this invention except as defined in the appended claims.

What is claimed is:

1. In a radar system having a directive antenna, and a cathode ray tube for the presentation of received signals, means for producing a mark on the screen of said cathode ray tube indicative of a predetermined direction relative to said system, and means for insuring that said mark be present as a single trace, comprising means for disabling said mark producing means for a predetermined time immediately following generation of a single trace by said mark producing means, said disabling means comprising a pulse generator triggered by said mark producing means.

2. In a radar system having a directive antenna, and a cathode ray tube for the presentation of received signals, means for producing a mark on the screen of said cathode ray tube indicative of a predetermined direction relative to said system, comprising a pulse generator, triggered by an antenna actuated switch, and means for insuring that said mark be present as a single trace, comprising means for disabling said mark producing means for a predetermined time immediately following generation of a single trace by said mark producing means, said disabling means comprising a pulse generator triggered by said mark producing means.

3. In a radar system having a directive antenna, and a cathode ray tube for the presentation of received signals, means for producing a mark on the screen of said cathode ray tube indicative of a predetermined direction relative to said system, comprising a pulse generator, triggered by an antenna actuated switch once every revolution of said antenna, and means for insuring that said mark be present as a single trace, comprising means for disabling said mark producing means for a predetermined time immediately following generation of a single trace by said mark producing means, said disabling means comprising a pulse generator triggered by said mark producing means.

4. In a radar system having a directive antenna, and a cathode ray tube for the presentation of received signals, means for producing a mark on the screen of said cathode ray tube indicative of a predetermined direction relative to said system, comprising a pulse generator, triggered by an antenna actuated switch once every revolution of said antenna, and means for insuring that said mark be present as a single trace, comprising means for disabling said mark producing means for a predetermined time immediately following generation of a single trace by said mark producing means, said disabling means comprising a pulse generator triggered by means of the trailing edge of a pulse used to produce said mark.

5. In a radar system having a directive antenna, and a cathode ray tube for the presentation of received signals, means for producing a mark on the screen of said cathode ray tube indicative of a predetermined direction relative to said system, and means for insuring that said mark be present as a single trace, comprising means for disabling said mark producing means for a predetermined time immediately following generation of a single trace by said mark producing means, said disabling means comprising a pulse generator triggered by means of the trailing edge of a pulse used to produce said mark.

6. In a radar system having a directive antenna, and a cathode ray tube for the presentation of received signals, means for producing a mark on the screen of said cathode ray tube indicative of a predetermined direction relative to said system, comprising a pulse generator triggered by an antenna actuated switch, and means for insuring that said mark be present as a single trace, comprising means for disabling said mark producing means for a predetermined time immediately following generation of a single trace by said mark producing means, said disabling means comprising a pulse generator triggered by means of the trailing edge of a pulse used to produce said mark.

ROBERT R. DARDEN, Jr.
MICHAEL F. KOLODZIEJ.

REFERENCES CITED

The following references are of record in the file of this patent:

UNITED STATES PATENTS

| Number | Name | Date |
| --- | --- | --- |
| 2,272,607 | Higonnet | Feb. 10, 1942 |